July 8, 1958  D. R. CRAIG  2,842,025
PHOTOGRAPHIC METHOD
Filed Sept. 2, 1954
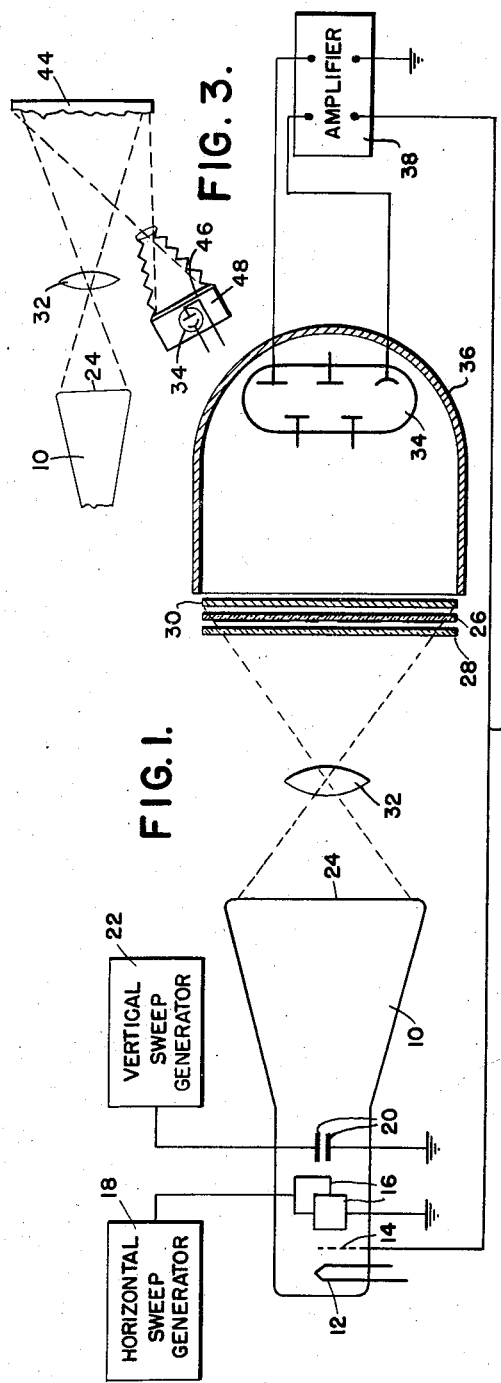
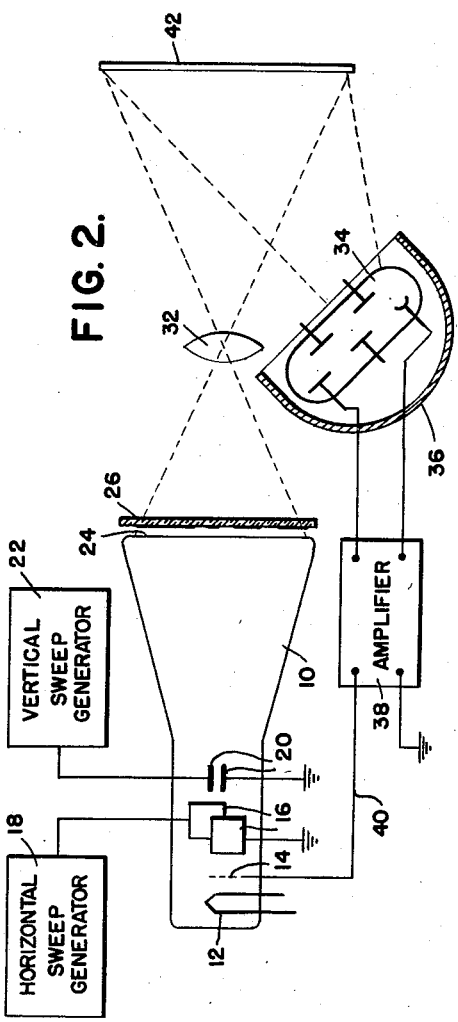
INVENTOR
Dwin R. Craig
BY Raymond W. Colton
ATTORNEY

United States Patent Office 2,842,025
Patented July 8, 1958

2,842,025

PHOTOGRAPHIC METHOD

Dwin R. Craig, Falls Church, Va., assignor, by mesne assignments, to LogEtronics, Inc., Alexandria, Va., a corporation of Delaware Application September 2, 1954, Serial No. 453,747

9 Claims. (Cl. 88—24)

This invention relates to a photographic method whereby uniformly exposed prints can be produced from negatives obtained under adverse lighting conditions and/or uniformly exposed negatives can be produced of objects capable of being illuminated under controlled conditions but which nevertheless produce extreme highlights and shadows or possess other undesirable reflectivity properties.

The problem presented by adverse lighting conditions is particularly serious in aerial and news photography where illumination is usually beyond the control of the photographer. In such cases a single negative may contain areas ranging from almost completely opaque to substantial transparency, and in most instances the overall density level will vary widely for different negatives. The production of uniform prints quickly and economically under such circumstances requires a method of automatic "dodging" and exposure control. The present invention solves this problem by illuminating the subject, which may be a positive, negative, or three dimensional body, with a scanning spot of light from a cathode ray tube, forming a contact or projection image of the subject on a photosensitive surface, sensing the intensity of light transmitted by or reflected from said surface by means of a photoelectric device, and controlling the spot intensity and/or area to produce substantially constant luminous energy, averaged over the spot area, throughout the entire photosensitive surface to be exposed.

As the spot diameter becomes smaller the prints produced with this method approach those obtained with "unsharp masks," attended by the advantages of being completely automatic, providing a single step operation and being applicable to cameras making original negatives from three dimensional subjects.

Inasmuch as the spot produced in accordance with the present invention may be sufficiently small to effectively dissect the image into millions of smaller picture elements, the completeness of "dodging" is far superior to that obtained with printing apparatus employing an array of thirty or forty selectively controlled light sources.

An example of what has been attempted previously along the lines of cathode ray tube scanning will be found in the disclosure of the patent to Simmon, No. 2,480,425, dated August 30, 1949 wherein distortion is introduced by a half-silvered mirror, and the light which is sensed is not directed from the photosensitive surface either by transmission therethrough or reflection therefrom.

Even prior to Simmon, in 1935, in French Patent No. 785,588, it was proposed in connection with television transmission to scan a motion picture film with a beam of light produced by a cathode ray tube, but in that case there was no thought of producing photographic prints nor was there any suggestion of sensing light transmitted from a photosensitive surface either by penetration or by reflection.

It is among the objects of this invention to provide a photographic method comprising energizing a light source to produce a variable light beam, directing the beam to illuminate a portion of a subject with a spot of finite area, scanning the subject with the spot and directing light from each portion of the subject to form a real image on a photosensitive surface to expose the same, directing light from the photosensitive surface to a light intensity sensing device, and modifying the light beam as a function of the sensed intensity to maintain the average exposure of all portions of the photosensitive surface substantially constant. The method is applicable to a variety of subjects, plane and three dimensional, light transmitting and opaque, photographic or otherwise. The characteristic of the beam modified as a function of the sensed intensity may be the intensity of the beam and/or the area of the spot produced thereby. The photosensitive surface is exposed to light transmitted from each portion of the subject by light directed through the subject or reflected therefrom and in some cases, the reflected light again penetrates the subject. Similarly, the light directed to the sensing device may be transmitted through the photosensitive surface or reflected therefrom. The light source is preferably a cathode ray tube of the kinescope type. Preferably, the subject is scanned in two dimensions along paths, such as sine waves or triangular waves, having substantially linear components whose ratio of repetition rates is other than an integer. In this way, the entire area of the subject will be covered and no fixed line pattern established.

By its very nature, the present invention inherently controls exposure automatically and renders over-exposure impossible.

The expression "average exposure" is defined as the product of light intensity and time averaged over a finite area, and may be represented mathematically as $$E = \frac{\int_0^A I.t dA}{A}$$

where I is light intensity, t is time, and A is the area involved.

A more complete understanding of the invention will follow from a description of the accompanying drawing wherein:

Fig. 1 is a diagrammatic illustration of the use of the invention for contact printing from a photographic transparency;

Fig. 2 is a diagrammatic illustration of an arrangement used for projection printing; and Fig. 3 is a fragmentary diagrammatic illustration of a modified arrangement for use with opaque or three dimensional subjects.

A cathode ray tube or kinescope 10 is provided with a cathode 12, a control grid 14, deflection plates 16 connected in circuit with a horizontal sweep generator 18, and deflection plates 20 connected in circuit with a vertical sweep generator 22. The electron beam produced by the tube produces light on a fluorescent screen 24 provided at the end of the tube from which light is directed through a photographic transparency 26 interposed between a glass plate 28 and a photosensitized surface 30 on which the ultimate print will be formed. Intermediate the glass supporting plate 28 and the cathode ray tube, a lens 32 has been shown for use where the fluorescent screen of the cathode tube is smaller than the transparency 26 to be reproduced. Where the cathode tube has a screen as large as or larger than the transparency 26, the lens 32 can be omitted. Beyond the photosensitized surface 30 in the light path, a photomultiplier tube 34 is provided within a light collector 36 so as to sense the intensity of light transmitted from the sensitized surface, in this case by penetration. The output of the photomultiplier tube 34 is connected to an amplifier 38, whose level can be adjusted in a conventional manner, the output of the amplifier being connected through a conductor 40 with the grid 14 of the cathode ray tube to produce a negative feed-back effect by which the intensity of light sensed by the photomultiplier tube will tend to remain constant. Similarly, the output of the amplifier 38 is applicable to modify the scanning speed and/or the spot size as a function of the light intensity sensed by the photomultiplier tube. By way of contrast, the Simmon patent merely retains a light intensity impinging on a photoelectric cell within a predetermined wide range based upon the ability of the emulsion to register the effects, from which it follows that if the emulsion were infinitely responsive, the modification of the light would be zero.

The arrangement depicted in Fig. 2 of the drawing illustrates projection printing on a photosensitized surface which is opaque to the light directed thereon by the cathode ray tube 10. In this case, the area of the print to be formed on the photosensitized surface 42 exceeds that of the transparency 26, the lens 32 producing the necessary enlargement. Inasmuch as the support for the photosensitized element 42 is opaque to light produced by the cathode ray tube, reflected light transmitted therefrom impinges on the photomultiplier tube 34 housed within the collector 36 to supply the amplifier 38 which in turn produces the inverse feed-back on the control grid 14 of the cathode ray tube to again assure a substantially uniform intensity of light for exposure of each increment of the photosensitive surface 42. It will be understood of course, that the substitution of a suitable lens will permit reduction by the projection printing arrangement of Fig. 2.

The arrangement illustrated in Fig. 3 employs a photoelectric device 34 connected as in the preceding circuits to vary the effect of a control grid of the kinescope 10 so as to modify the spot size or intensity as a function of the intensity of light reflected from a subject 44 which in this case is a three dimensional body or a reproduction, photographic or otherwise, formed on an opaque base. The photosensitized surface 46 is shown as housed within a camera 48 behind which the photoelectric device 34 is disposed.

Other variations already recognized by the present inventor will suggest themselves to those skilled in the art and accordingly, the invention should not be limited to the two forms illustrated beyond the scope of the appended claims.

I claim:

1. A photographic method for reducing gross contrast and substantially increasing detail contrast of elemental areas lacking in contrast comprising energizing a light source to produce a variable light beam, directing said beam to illuminate an elemental area of a subject to be reproduced with a spot of the same area, scanning said subject with said spot and directing light produced by said spot from each portion of said subject to form a real image on a photosensitive surface and simultaneously expose the same, directing light with equal efficiency from all portions of said photosensitive surface to a light intensity sensing device, and continuously modifying said light beam as a function of the sensed intensity to produce substantially constant average exposure of all elemental areas of the photosensitive surface.

2. A photographic method as set forth in claim 1 wherein the light directed to the sensing device is transmitted through said photosensitive surface.

3. A photographic method as set forth in claim 1 wherein the light directed to the sensing device is reflected from said photosensitive surface.

4. A photographic method as set forth in claim 1 wherein light is directed through the subject to the photosensitive surface.

5. A photographic method as set forth in claim 1 wherein light is reflected from the subject to the photosensitive surface.

6. A photographic method as set forth in claim 1 wherein the intensity of the beam is modified as a function of the sensed intensity.

7. A photographic method as set forth in claim 1 wherein the area of the spot is modified as a function of the sensed intensity.

8. A photographic method as set forth in claim 1 wherein the light source is a cathode ray tube.

9. A photographic method as set forth in claim 1 wherein the subject is scanned in two dimensions along paths having substantially linear components whose ratio of repetition rates is other than an integer.

References Cited in the file of this patent

UNITED STATES PATENTS

| | | |
|---|---|---|
| 1,742,943 | Tuttle et al. | Jan. 7, 1930 |
| 2,101,932 | Eggert et al. | Dec. 14, 1937 |
| 2,309,048 | Curry | Jan. 19, 1943 |
| 2,480,423 | Simmon | Aug. 30, 1949 |
| 2,480,425 | Simmon | Aug. 30, 1949 |
| 2,484,299 | Labrum | Oct. 11, 1949 |
| 2,668,474 | Rogers | Feb. 9, 1954 |
| 2,691,917 | Curry | Oct. 19, 1954 |

FOREIGN PATENTS

| | | |
|---|---|---|
| 713,285 | Great Britain | Aug. 11, 1954 |